July 3, 1928. 1,675,960
L. SCHÖN ET AL
ALTERNATING CURRENT INDUCTION MOTOR
Filed March 7, 1925 3 Sheets-Sheet 3

Patented July 3, 1928.

1,675,960

UNITED STATES PATENT OFFICE.

LUDWIG SCHÖN, OF ESSEN, GERMANY, AND WILHELM LEUKERT, OF LEIPA, CZECHO-SLOVAKIA, ASSIGNORS TO FRIED. KRUPP AKTIENGESELLSCHAFT, OF ESSEN-ON-THE-RUHR, GERMANY.

ALTERNATING-CURRENT INDUCTION MOTOR.

Application filed March 7, 1925, Serial No. 13,827, and in Germany March 13, 1924.

In alternating current induction motors there is ordinarily beside the working field which rotates in the same direction with the motor an interfering inverse rotating field which is a great disadvantage, particularly in single-phase induction motors, for in these it is of the same magnitude as the working rotating field and is the cause of the important disadvantage that the motor cannot start by itself under load and is capable of being overloaded only to a slight extent. It has already been attempted to suppress the inverse rotating field by means of an auxiliary rotor provided with a short circuit winding, but no operative motor of this kind has been produced prior to the present invention. This invention lies in the recognition of the fact that the above mentioned failures were caused on the one hand by the large stray flux resulting from the arrangement of the auxiliary rotor and on the other hand by the large phase displacement of the alternating current supplied, which results from the double air gap in the path of the magnetic field, caused by the auxiliary rotor, which makes a correspondingly higher magnetizing current necessary. According to the invention, for the purpose of compensating the stray flux and phase displacement there is inserted in the magnetic circuit of the motor a boosting field rotating in synchronism with the frequency of the alternating current supplied, which boosting field is created by an exciting winding arranged on the auxiliary rotor. In this manner applicants have succeeded in producing motors adapted, for example, for driving electric locomotives which are provided with current of any desired frequency from a single-phase line.

Two embodiments of the subject-matter of the invention are illustrated in the accompanying drawings in which.

Figure 1:
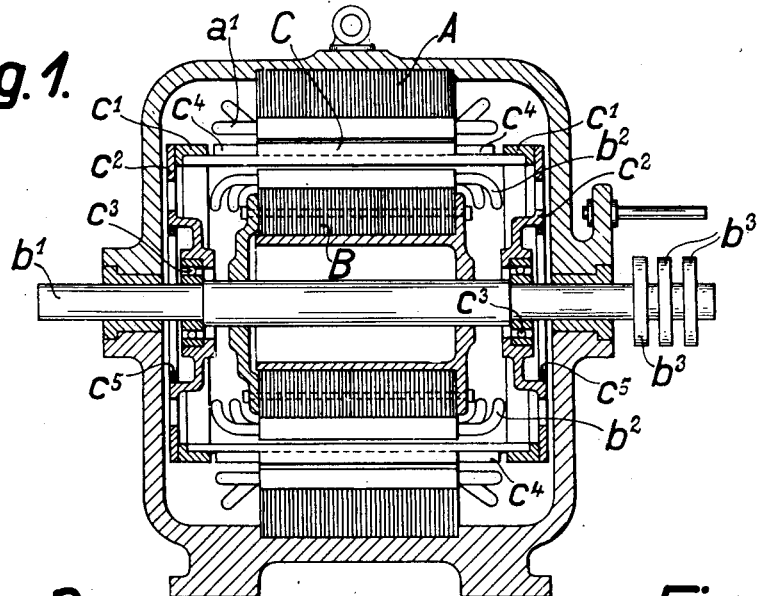
Fig. 1 is a vertical longitudinal section through the first embodiment.
Figure 3:
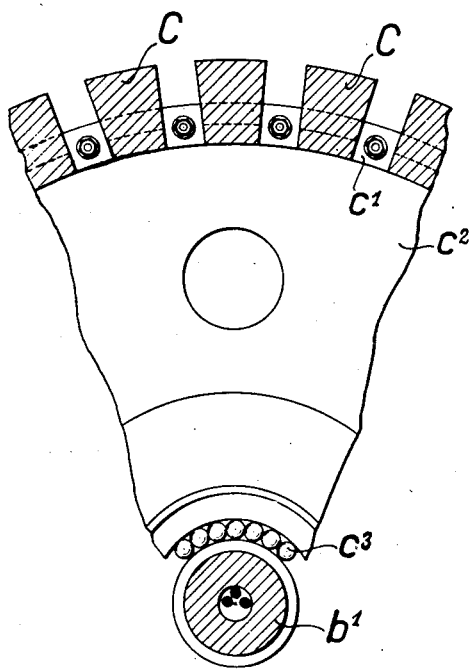
Fig. 3 is a section along the line 3—3 of Fig. 2, seen from the right,
Figure 2:
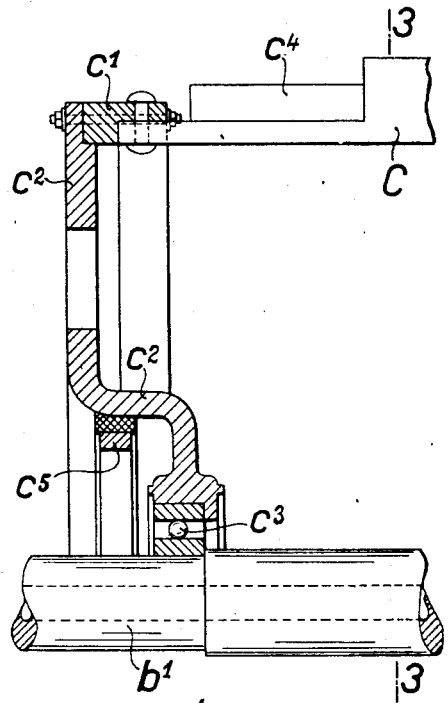
Fig. 2 is a detail of Fig. 1 on an enlarged scale.

A is the stator (Fig. 1) and B the rotor of a single-phase induction motor which has the space between the stator and the rotor enlarged and in this enlarged space there is arranged the shell portion of a drum-shaped body which is adapted to rotate around the shaft of the rotor. This body which will hereinafter be called auxiliary rotor, consists of a plurality of circumferentially spaced iron bars $C$ extending parallel to the rotor shaft and having their ends held together and conductively connected with one another by a ring $c^1$ each of brass or steel bronze. The auxiliary rotor $C\ c^1$ constructed in the way of a squirrel-cage armature, therefor constitutes a short-circuit armature winding. Each of the two rings $c^1$ is connected by screw bolts with the adjacent head wall $c^2$ of the drum-shaped body $C\ c^1\ c^2$; the body $C\ c^1\ c^2$ itself is rotatably mounted by means of two ball bearings $c^3$ on the rotor shaft $b^1$. Owing to the arrangement of the ball bearings, the radial air spaces between the stator, the auxiliary rotor and the rotor are securely rendered invariable which is of special importance. Disposed between the iron bars $C$ is an exciting winding $c^4$ which is connected in series with a regulating resistance $c^6$ (Fig. 5) to a source $G$ (Fig. 5) of continuous current of a controllable tension through collector rings $c^5$ which are arranged at the head walls $c^2$.

Figure 5:
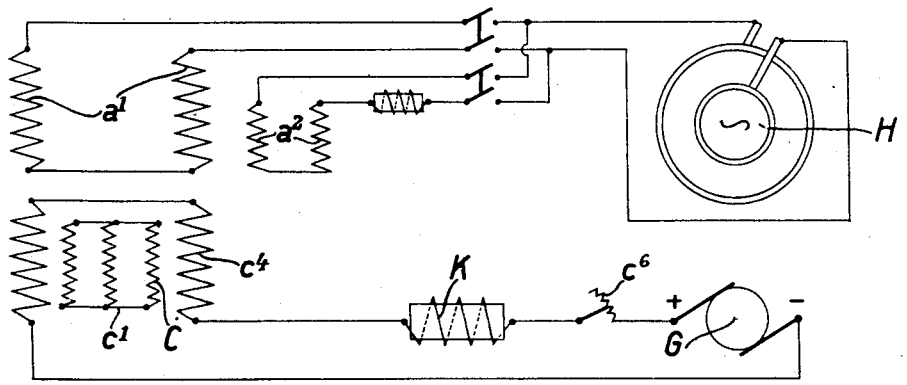
Fig. 5 is a diagram of the electric circuits of both embodiments.
Figure 5:
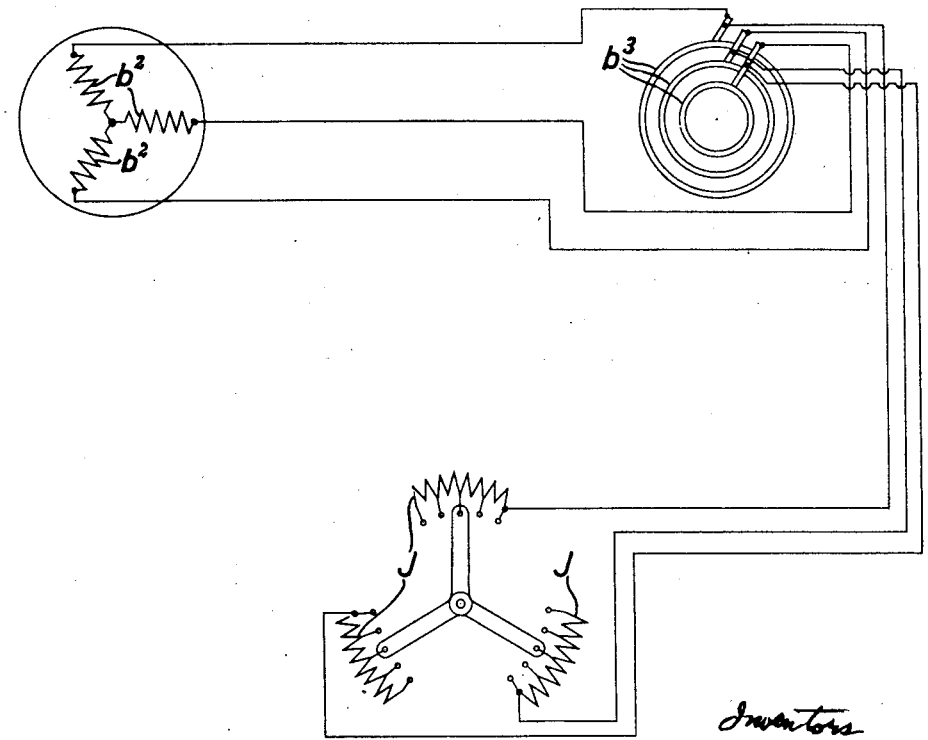

The stator $A$ is provided, in a manner known per se, with a winding $a^1$ connected to a source $H$ (Fig. 5) of single-phase current and with an auxiliary winding $a^2$ (Fig. 5) which is only operative in the starting and which may therefore be switched off by special means. The rotor $B$ carries a three-phase winding $b^2$ the ends of which are, on the one hand, in star-connection with one another and, on the other hand, connected with three collector rings $b^3$ (Figs. 1 and 5) mounted on the rotor shaft $b^1$ so that they may be placed into connection with a starting resistance $J$ (Fig. 5).

In order to start the described motor— either without load or under load—the stator winding $a^1$ together with the said auxiliary winding (auxiliary phase) is switched in, while the rotor winding $b^2$ is open and the winding $c^4$ of the auxiliary rotor unexcited. Under the action of the two-phase rotating field produced by the stator and of the currents induced in the auxiliary rotor $C\ c^1$, the latter starts in a definite sense of rotation, viz., in the sense of the rotation of the rotating field, and will soon reach a number of revolutions not very different from synchronism. If, now, the auxiliary phase is switched off, the revolving auxiliary rotor $C$ $c^1$ acts on the two oppositely revolving rotating fields, into which the single-phase alternating stator field may be thought resolved according to a common view, in such a manner that the rotating field revolving in the sense of rotation of the auxiliary rotor $C$ $c^1$ is considerably boosted, while the oppositely revolving rotating field is caused to practically disappear. This circumstance renders it possible to start the rotor B by the use of starting resistances in exactly the same manner as the rotor of a multi-phase motor. As, owing to the high magnetic resistance in the direction of the circumference, the rotating field revolving in the stator is forced to close itself through the rotor B, so that the magnetic flux in the auxiliary rotor in the direction of the circumference is for its largest part subdued, the rotor winding $b^2$ is interlinked with the said rotating field in exactly the same way as in a multi-phase motor and no leakage flux of importance will arise. Therefore, in order to produce the turning moment required for starting the motor, it is only necessary to close the rotor winding $b^2$ by switching in starting resistances; the motor may be fully loaded during this operation as there is produced a starting turning moment amounting to a multiple of the normal turning moment.

If now the exciting winding $c^4$ of the auxiliary rotor $C$ $c^1$ is connected with the source of continuous current already mentioned in such a manner as to cause the polarity of the auxiliary rotor to change in accordance with the numbers of poles of the stator A, the auxiliary rotor becomes in a manner the rotor of a synchronous motor by rotating synchronously with the operative rotating field of the stator and taking in this rotating field such a position that opposite poles follow each other on the magnetic path of the lines of force, which means that e. g. a north pole of the stator is opposite to a south pole of the auxiliary rotor and that the latter in turn is opposite to a north pole of the rotor. According to the strength chosen for the exciting current in the winding $c^4$ the phase-displacement between the strength and the tension of the single-phase current supplied to the stator winding $a^1$ may be influenced as desired the same as in an ordinary synchronous motor. Therefore this phase-displacement may, for instance, be reduced or entirely removed, which means that a power-factor of $\cos \phi = 1$ may be imparted to the motor, or the lag of the current with regard to the tention may be converted into a lead of the current.

As a matter of course, the above-described squirrel-cage winding of the auxiliary rotor may be substituted by a short-circuit armature winding of any other suitable kind. But same must be at least a two phase winding if it is desired to secure the possibility of starting the auxiliary rotor by means of an auxiliary phase.

There might result from the circumstance that the exciting winding acts as a short-circuit winding with relation to the inverse remnant field, a non-constant rotating field. This may be overcome either by a choking coil K (Fig. 5) connected in series with and subduing the short-circuit currents in the exciting winding or by correspondingly dimensioning the short-circuit armature winding of the auxiliary rotor.

Figure 4:
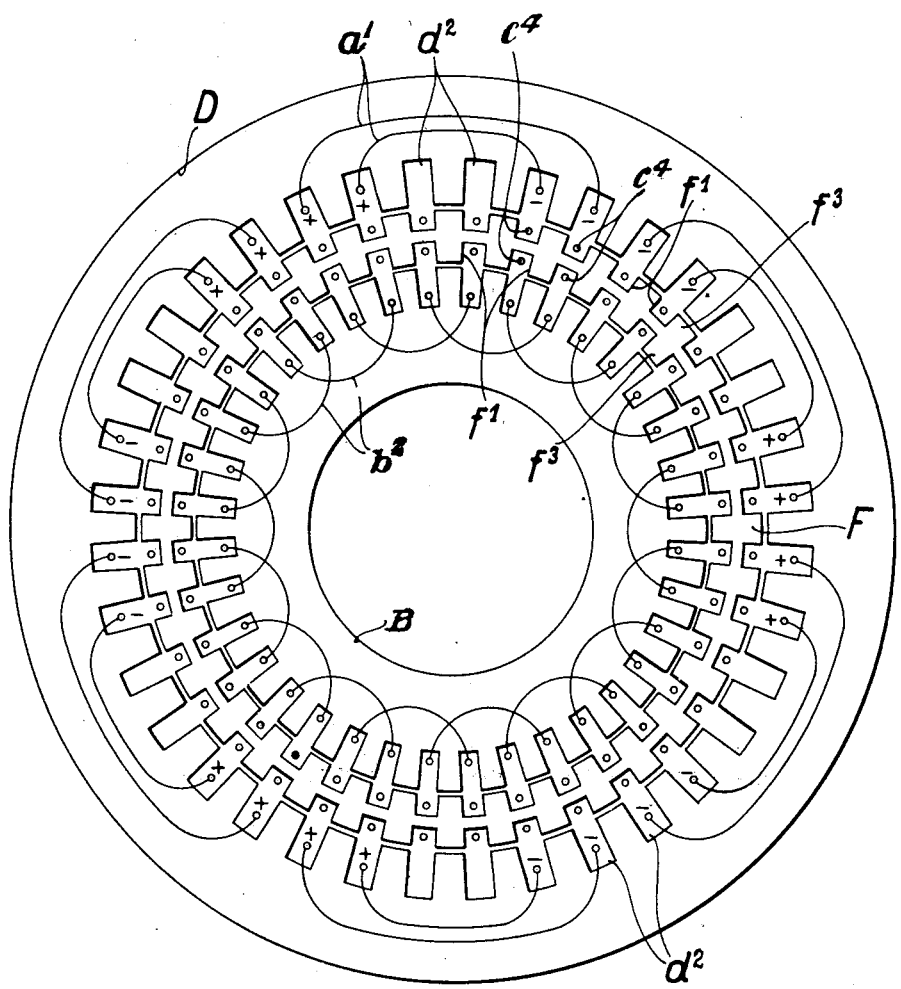
Fig. 4 is a diagrammatic view of the second embodiment.

In the second embodiment, shown in Fig. 4, the auxiliary rotor consists of a drum the iron shell F of which has milled into it on the outer and inner side slots $f^1$ arranged in pairs opposite each other and designed to receive the exciting winding $c^4$. The exciting winding $c^4$ is arranged so that the teeth $f^3$ lying between the slots $f^1$ on the outer shell side possess a polarity opposite to that of the teeth on the inner side, the sense of direction of the flux alternating with every pole-pitch, and that, besides, corresponding points of adjacent poles have the same magnetic potential. Arranged for cooperation with the auxiliary rotor F is a stator D provided with a single phase winding $a^1$ and a rotor B carrying a three-phase winding $b^2$, two slots $d^2$ in every pole-pitch of the stator D being shown empty for the reception of the auxiliary phase $a^2$ (Fig. 5) designed to enable the starting of the auxiliary rotor F. With the described construction of the auxiliary rotor F, every north pole of the stator has arranged oppositely to it a south pole of the auxiliary rotor and every south pole of the rotor has arranged oppositely to it a north pole of the auxiliary rotor cooperative with the said south pole of the auxiliary rotor. As regards the course of the lines of force this embodiment of the invention therefore has, in general, the same effect as the first described embodiment; more particularly, any magnetic flux in the direction of the circumference of the auxiliary rotor F is subdued owing to the fact that no difference of potential exists between corresponding points of adjacent poles. The same as in the device described first, it is possible to change the primary phase-displacement by regulating the strength of the continuous current producing the excitation of the auxiliary rotor F.

The main advantage of the described single-phase induction motor resides in that it may be started under load and even with a considerable overload and that it is equivalent in its working to the multiphase induction motors which are much esteemed because of their reliability. Another essential advantage consists in the possibility of avoiding or changing into lead by simple means the phase-displacement between the primary current and the tension.

The single-phase stator winding $a^1$ of the described alternating current induction motor may also be replaced by a multiphase winding, such as e. g. a three-phase winding. It is thus rendered possible to obtain in a simple way a compensated multiphase motor which distinguishes from well-known multiphase motors with means for compensating the phase-displacement by the fact that it requires neither a commutator nor an auxiliary motor or the like.

What we claim is:

1. An alternating current induction motor comprising a stator, a rotor and an auxiliary rotor all concentrically arranged, a stator winding and a rotor winding, one of said windings being connected to a source of alternating current, a short-circuit armature winding carried by the auxiliary rotor and an exciting winding also arranged on the auxiliary rotor to generate a magnetic flux passing through the stator, the auxiliary rotor and the rotor.

2. An alternating current induction motor as specified in claim 1, said auxiliary rotor having a magnetizable body so divided in the direction of circumference as to offer a very considerable magnetic resistance in the direction of circumference and a very small resistance in radial direction.

3. An alternating current induction motor as spectified in claim 1, the auxiliary rotor having a shell consisting of iron bars magnetically insulated from one another and of front rings connecting the iron bars.

4. An alternating current induction motor as specified in claim 1, said exciting winding arranged on the auxiliary rotor being connected to a source of continuous current.

5. A single-phase alternating current induction motor comprising a stator, a rotor and an auxiliary rotor all concentrically arranged, a stator winding and a rotor winding, one of said windings being connected to a source of single-phase alternating current, a short-circuit armature winding carried by the auxiliary rotor, an exciting winding also arranged on the auxiliary rotor to generate a magnetic flux passing through the stator, the auxiliary rotor and the rotor, and an auxiliary winding for starting the auxiliary rotor arranged on the part carrying the winding connected to the source of single-phase alternating current.

The foregoing specification signed at Prague Czechoslovakia, this 16th day of February, 1925.

LUDWIG SCHÖN.
WILHELM LEUKERT.